US006719308B2

(12) United States Patent
Parker

(10) Patent No.: US 6,719,308 B2
(45) Date of Patent: Apr. 13, 2004

(54) TABLE CARRIER AND METHODS

(75) Inventor: Robby James Parker, Thornton, CO (US)

(73) Assignee: First Data Corporation, Englewood, CO (US)

( * ) Notice: Subject to any disclaimer, the term of this patent is extended or adjusted under 35 U.S.C. 154(b) by 12 days.

(21) Appl. No.: 10/003,272

(22) Filed: Dec. 6, 2001

(65) Prior Publication Data

US 2003/0107196 A1 Jun. 12, 2003

(51) Int. Cl.[7] .................................................. B62B 3/00
(52) U.S. Cl. ..................... 280/47.34; 280/79.7; 280/649
(58) Field of Search ........................... 280/43.12, 47.34, 280/47.35, 79.11, 79.4, 79.6, 79.7, 649, 651; 182/153, 154; 403/116

(56) References Cited

U.S. PATENT DOCUMENTS

| 555,584 | A | * | 3/1896 | Pleukharp | 280/33.997 |
|---|---|---|---|---|---|
| 808,940 | A | * | 1/1906 | Meisel | 182/154 |
| 955,014 | A | * | 4/1910 | Tandy | 211/27 |
| 1,608,552 | A | * | 11/1926 | Ellis | 248/129 |
| 2,536,561 | A | * | 1/1951 | Mickam | 414/480 |
| 3,021,011 | A | * | 2/1962 | Visneski | 211/49.1 |
| 3,982,768 | A | * | 9/1976 | Getman | 280/79.11 |
| 3,994,461 | A | * | 11/1976 | Dorantes | 248/188.7 |
| 4,133,412 | A | * | 1/1979 | Hildebrandt | 182/154 |
| 4,386,677 | A | * | 6/1983 | Gulezian | 182/154 |
| 4,705,247 | A | * | 11/1987 | Delmerico | 248/98 |
| 4,832,355 | A | * | 5/1989 | Hung | 280/32.5 |
| 4,964,650 | A | * | 10/1990 | Dickinson | 280/641 |
| D316,639 | S | * | 5/1991 | Adler | D6/429 |
| 5,163,695 | A | * | 11/1992 | Pakowsky | 280/79.7 |
| 5,253,887 | A | * | 10/1993 | Marenger | 280/79.3 |
| 5,636,853 | A | * | 6/1997 | Huang | 280/30 |
| 5,732,960 | A | * | 3/1998 | Elam | 280/79.4 |
| 5,829,948 | A | * | 11/1998 | Becklund | 414/607 |
| D405,294 | S | * | 2/1999 | Adams | D6/462 |
| 5,871,219 | A | * | 2/1999 | Elliott | 280/79.3 |
| 6,099,001 | A | * | 8/2000 | Barresi | 280/79.6 |
| 6,102,645 | A | * | 8/2000 | Kooima et al. | 414/537 |
| 6,296,262 | B1 | * | 10/2001 | Skinner | 280/79.7 |
| 6,390,759 | B1 | * | 5/2002 | Novak et al. | 414/430 |
| 6,484,649 | B1 | * | 11/2002 | Wang | 108/158 |

* cited by examiner

*Primary Examiner*—Brian L. Johnson
*Assistant Examiner*—Christopher Bottorff
(74) *Attorney, Agent, or Firm*—Townsend and Townsend and Crew LLP

(57) ABSTRACT

A table carrier comprises a support member and a plurality of wheels that are coupled to the support member. A stand is also coupled to the support member and defines a holding region for receiving and holding a table. In turn, the table comprises a base and a top that is coupled to the base. The holding region is configured to receive the base with the top extending alongside the stand.

11 Claims, 3 Drawing Sheets

TABLE CARRIER AND METHODS

BACKGROUND OF THE INVENTION

This invention relates generally to the field of carriers, and in particular, to carriers that are useful in transporting bulky or awkward items, such as furniture. In one aspect, the invention relates to a carrier that is particularly useful in carrying tables, as well as other items.

Transport of large or bulky items has long been a challenge. One common example of such a situation is the movement of furniture, office equipment, or the like from one location to another. For instance, it is common to move furniture from one office to another as personnel assignments change. Items such as desks, tables, credenzas, and the like can be difficult to move through small corridors, such as doorways, halls, and the like. For example, when moving a piece of furniture through a doorway, the size of the piece of furniture may require two or more individuals to grasp and lift the piece of furniture and then attempt to carry it through the doorway. However, because of the size or configuration of the piece of furniture, it may be difficult to move the piece of furniture through the doorway without damaging the furniture or causing injury to the individuals moving the piece of furniture.

One specific example of such a situation is the transport of tables that have a pedestal and a table top. Such tables typically require two individuals to grasp and lift the table, one at the base and one at the table top. However, because of the size of the table top, the table often needs to be moved through the doorway in a sideways orientation. However, when moving the table in the sideways orientation, the individuals are unable to fit through the doorway along with the table. Hence, a great need exists to provide equipment and techniques to permit items, such as furniture and other large and awkward items to be moved through spaces of limited size.

BRIEF SUMMARY OF THE INVENTION

The invention provides various carriers and methods for their use. Such carriers may be used to transport large and bulky items, such as furniture, office equipment and the like. In one particular embodiment, the invention provides a table carrier that comprises a support member and a plurality of wheels that are coupled to the support member. A stand is also coupled to the support member and includes a holding region for receiving and holding a table. The holding region is specifically configured to hold a table that has a base and a top that is coupled to the base. When the table is placed onto the stand, the base is received in the holding region, with the top of the table extending alongside the stand. In this way, the table may be lifted onto the carrier which may then be wheeled to another location. By placing the table onto the stand in this manner, it may more easily be moved through small areas, such as through doorways, hallways, and the like.

In one particular aspect, the holding region is V-shaped in geometry so that the base of the table may be wedged into the holding region when placed onto the stand. Conveniently, the V-shaped holding region may be formed by two sets of crossing arms that are spaced apart from each other. Optionally, a crossbar may be placed between the two sets of arms to provide additional stability. Further, a material, such as carpet, may be placed onto the ends of the arms to protect the table during its transport.

In another specific aspect, the base of the table may have a central axis that is perpendicular to the plane defined by the top of the table. In this way, when the table is placed onto the stand, the axis of the base is generally horizontal while the plane of the top is generally vertical. Such an orientation facilitates movement of the table through small areas, such as doorways as previously described. In some cases, the base of the table may be cylindrical while the top of the table is round. In still a further aspect, the support member may be constructed of a top piece and a bottom piece. In this way, the top piece may be removed from the bottom piece to remove the stand. The bottom piece, along with the wheels, then forms a cart that may be used to move other items after the table has been removed.

DESCRIPTION OF THE SPECIFIC EMBODIMENTS

The invention provides various carriers that may be used to transport a variety of large and/or bulky items. The items that may be used with the carriers of the invention include, for example, furniture, office equipment, and the like. The carriers are configured to hold the items in such a way as to facilitate their movement through small areas, such as through doorways, hallways, and the like.

Although not limited to specific items, the invention will find particular use when transporting tables. Such tables may have one or more legs which may comprise a simple pedestal or base. Coupled to the legs is a table top that is typically perpendicular to the legs. The carriers of the invention may be configured to hold such tables in a sideways orientation so that they can be moved through doorways without being limited by individuals. As such, the chances of injury to the table or the individuals may be significantly reduced or eliminated. The carriers of the invention are configured to hold such tables in a stable manner so that they may be safely moved while in a particular configuration.

Figure 1:
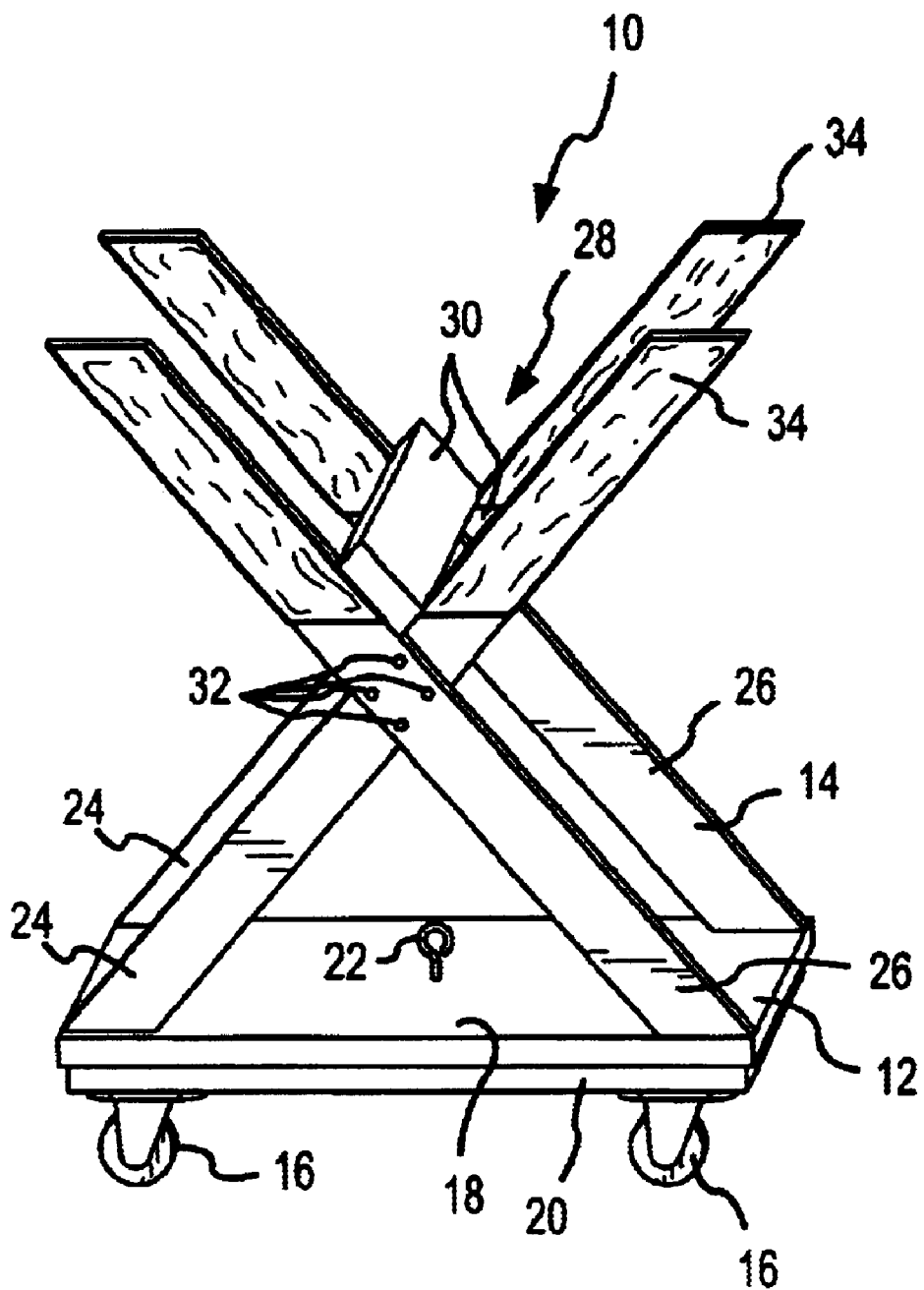
FIG. 1 is a perspective view of one embodiment of a carrier according to the invention.

Referring now to FIG. 1, one embodiment of a carrier 10 will be described. Carrier 10 comprises a support member 12 that is coupled to a stand 14. Coupled to support member 12 are a plurality of wheels 16. In this case, carrier 10 includes four wheels, but it will be appreciated that other numbers of wheels may be used as well. As shown, wheels 16 are coupled to support member 12 such that they may rotate 360°. However, other configurations could be used. Further, it will be appreciated that a variety of wheel configurations may be used, including simple rollers, casters, and the like.

Support member 12 may optionally be constructed of a top piece 18 and a bottom piece 20. Top piece 18 and bottom piece 20 may be held together by a screw or bolt 22. In this manner, when bolt 22 is removed, top piece 18 having a stand 14 may be removed to form a cart which comprises bottom piece 20 and wheels 16. In this way, the cart may be separately used to move items as is known in the art.

Stand 14 is constructed of two sets of crossing arms 24 and 26. Arms 24 and 26 define a V-shaped holding region 28 for holding the base of a table as described hereinafter. Optionally, one or more cross-members 30 may be positioned between each set of arms to provide stability to the arms.

Arms 24 and 26 as well as support member 12 may be conveniently be constructed of wood, although other materials may be used, such as plastics, composites, and the like. Arms 24 and 26 may conveniently be coupled to support member by nails, screws, glue and the like. As shown, arms 24 and 26 are screwed to each other by screws 32. In this way, arms 24 and 26 are fixedly attached to each other. However, it will be appreciated that in some cases a simple pin may be placed through openings in arms 24 and 26 to permit arms 24 and 26 to be movable relative to each other. In this way, the angle of V-shaped region 28 may be varied by simply pulling the pin, adjusting the angle of the arms relative to each other, and then inserting the pin through another hole in each of the arms. Optionally, a material 34 such as carpet, padding, fabric, or the like may be placed onto the ends of arms 24 and 26 as well as cross-members 30 to help protect the table when placed onto stand 14.

Figure 2:
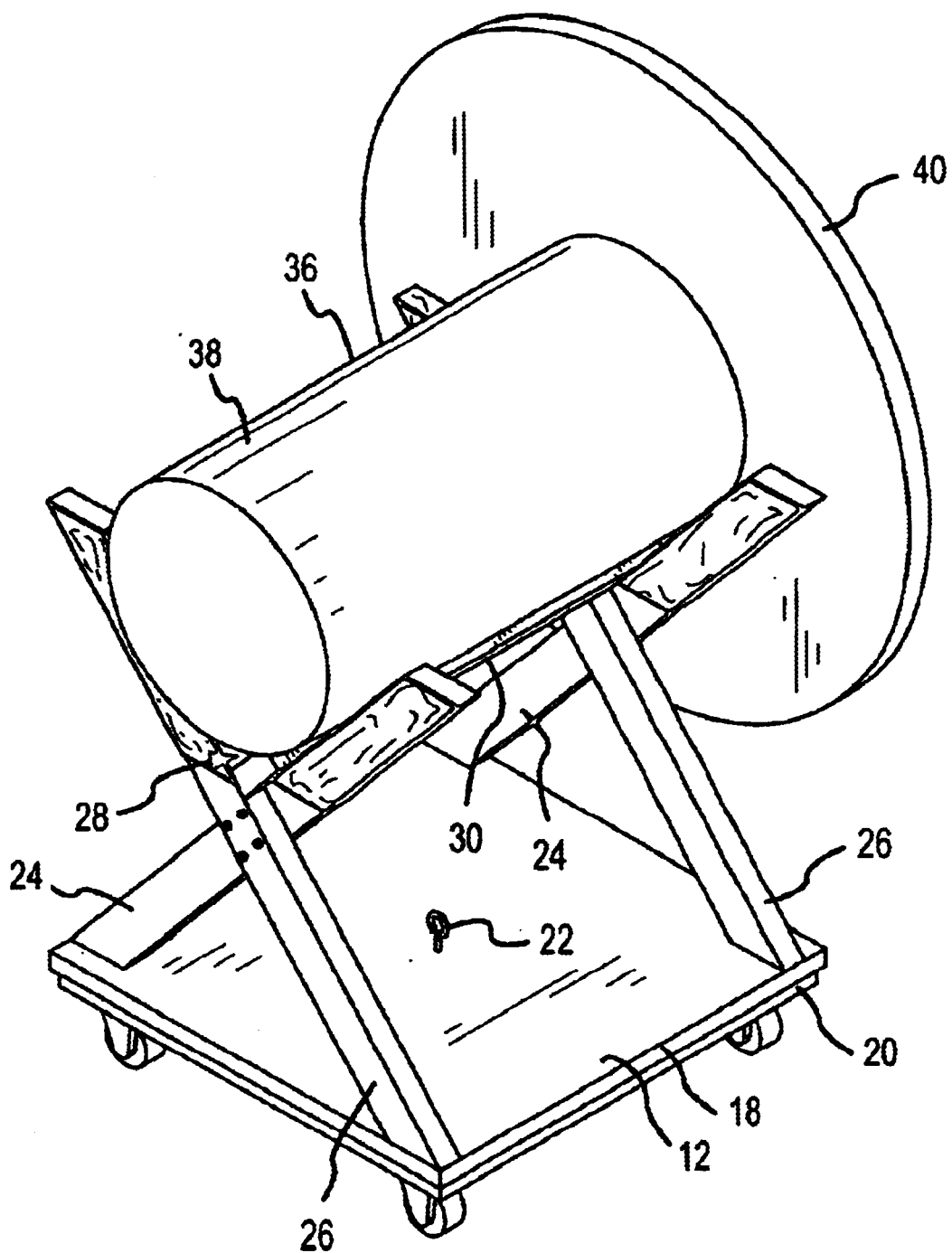
FIG. 2 illustrates the carrier of FIG. 1 when holding a table according to the invention.
Figure 3:
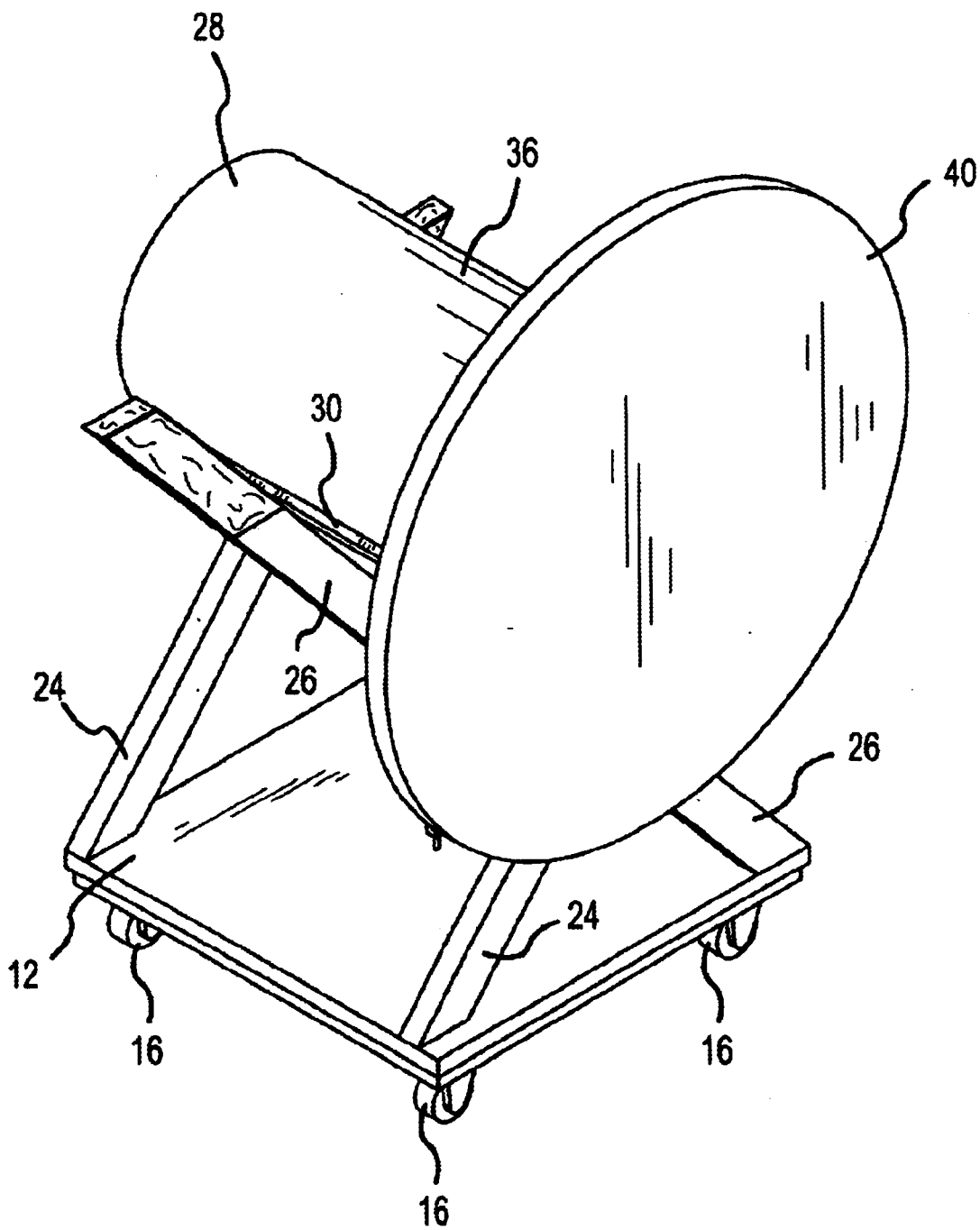
FIG. 3 illustrates the carrier and table of FIG. 2 from a different perspective.

Referring now to FIGS. 2 and 3, placement of a table 36 onto carrier 10 will be described. Although carrier 10 is illustrated carrying a table of a specific configuration and geometry, it will be appreciated that carrier 10 may be used to carry other tables as well as other equipment, and that the invention is not intended to be limited for use with only table 36.

Table 36 comprises a cylindrical base 38 that is coupled to a round table top 40. Table 36 is difficult to maneuver through tight areas, such as doorways because it is typically lifted and carried by two individuals, one grasping top 40 while the other is grasping base 38. However, when moved sideways so that top 40 may fit through the doorway, it is difficult for the two individuals to maintain their grasp on table 36. As shown in FIGS. 2 and 3, this problem is avoided by permitting table 36 to be lifted onto carrier 10, with base 38 resting within holding region 28. Table 36 is placed onto stand 14 such that the central axis of base 38 is generally horizontal while the plane defined by table top 40 is generally vertical. Further, table top 40 is placed close to arms 24 and 26 so that the center of the mass of table 36 is positioned near the center of carrier 10. In this way, carrier 10 and table 36 remain stable during transport. Holding region 28 assists in stabilizing table 36 by permitting base 38 to become wedged between each set of arms 24 and 26 as shown. Further, material 34 protects base 38 so that it does not become scratched or damaged during handling.

Once placed onto carrier 10, a single individual may easily push or pull carrier 10 through any desired access way. When arriving at the desired location, table 36 may simply be lifted from carrier 10 and placed into position.

Hence, carrier 10 provides a way for table 36 to easily be placed onto stand 14 where the table may be transported to another location with minimal effort. Further, by orienting table 36 in the position illustrated in FIGS. 2 and 3, it is easier to move table 36 through tight spaces. Further, once table 36 is removed from carrier 10, carrier 10 may be disassembled to permit bottom piece 20 to be used as a cart to facilitate movement of other items.

The invention has now been described in detail for purposes of clarity of understanding. However, it will be appreciated that certain changes and modifications may be practiced within the scope of the appended claims.

What is claimed is:

1. A table carrier comprising:
   a support member;
   a plurality of wheels coupled to the support member; and
   a stand coupled to the support member, wherein the stand comprises two sets of spaced apart arms, wherein the arms of each set cross each other at midsections of the arms, the arms defining a V-shaped holding region that is adapted to receive and hold a table that comprises a base and a top that is coupled to the base, wherein the holding region is adapted to receive the base, with the top extending along side the stand and above the support member;
   wherein the support member comprises a top and a bottom, wherein the stand is coupled to the top, and the wheels are coupled to the bottom to form a cart, and wherein the top of the support member is removably coupled to the bottom of the support member to permit the stand to be removed.

2. A carrier as in claim 1, wherein the crossing arms of each set are adjustable to vary the angle of the V-shaped region.

3. A carrier as in claim 1, wherein the base of the table has a central axis, wherein the top of the table defines a plane, with the plane of the table being orthogonal to the central axis, and wherein the holding region is adapted to hold the table such that the central axis of the base is generally horizontal and the plane of the top is generally vertical.

4. A carrier as in claim 1, wherein the base of the table is cylindrical and the top is round, and wherein the holding region is adapted such that the base is wedged to the stand when held within the holding region.

5. A method for moving a table, the method comprising:
   providing a table carrier comprising a support member, a plurality of wheels coupled to the support member, and a stand coupled to the support member that defines a holding region;
   placing a table onto the stand, the table comprising a base and a top that is coupled to the base, wherein the table is placed onto the stand such that the base is received into the holding region, with the top extending along side the stand and being held above the support member; and
   rolling the carrier over a surface using the wheels;
   wherein the support member comprises a top and a bottom, wherein the stand is coupled to the top, and the wheels are coupled to the bottom to form a cart, and further comprising removing the top of the support member from the bottom of the support member to remove the stand.

6. A method as in claim 5, further comprising tilting the table onto its side and separately lifting the top and the base to place the table onto the stand.

7. A method as in claim 5, wherein the holding region is V-shaped in geometry, wherein the base of the table is cylindrical and the top is round, and wherein the table is placed onto the stand such that the base is wedged within the V-shaped holding region.

8. A method as in claim 7, wherein the stand comprises two set of crossing arms, wherein the sets of crossing arms are spaced apart from each other to define the V-shaped holding region, and wherein the table is placed onto the stand such that the sets of arms are positioned near ends of the base.

9. A method as in claim 7, further comprising adjusting the orientation of each set of crossing arms to vary the angle of the V-shaped region.

10. A method as in claim 5, wherein the base of the table has a central axis, wherein the top of the table defines a plane, with the plane of the table being orthogonal to the central axis, and wherein the table is placed onto the stand such that the central axis of the base is generally horizontal and the plane of the top is generally vertical.

11. A method as in 5, further comprising placing another object onto the cart after removing the stand.

* * * * *